Figure 1:
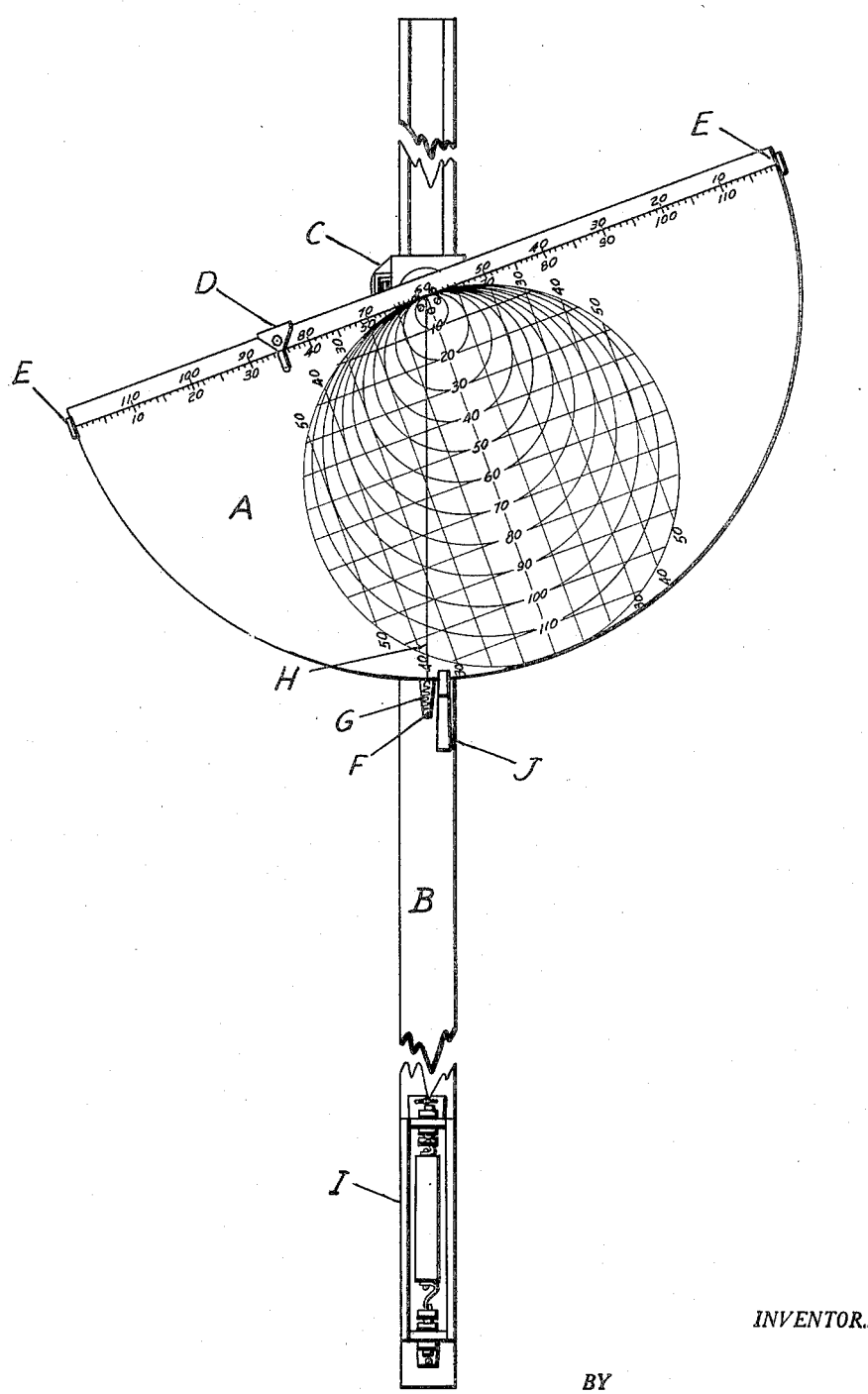

March 19, 1957  E. L. FOSTER  2,785,466
STADIA TOPOGRAPH
Filed Dec. 21, 1954  3 Sheets-Sheet 1

INVENTOR.
BY
Eugene L. Foster

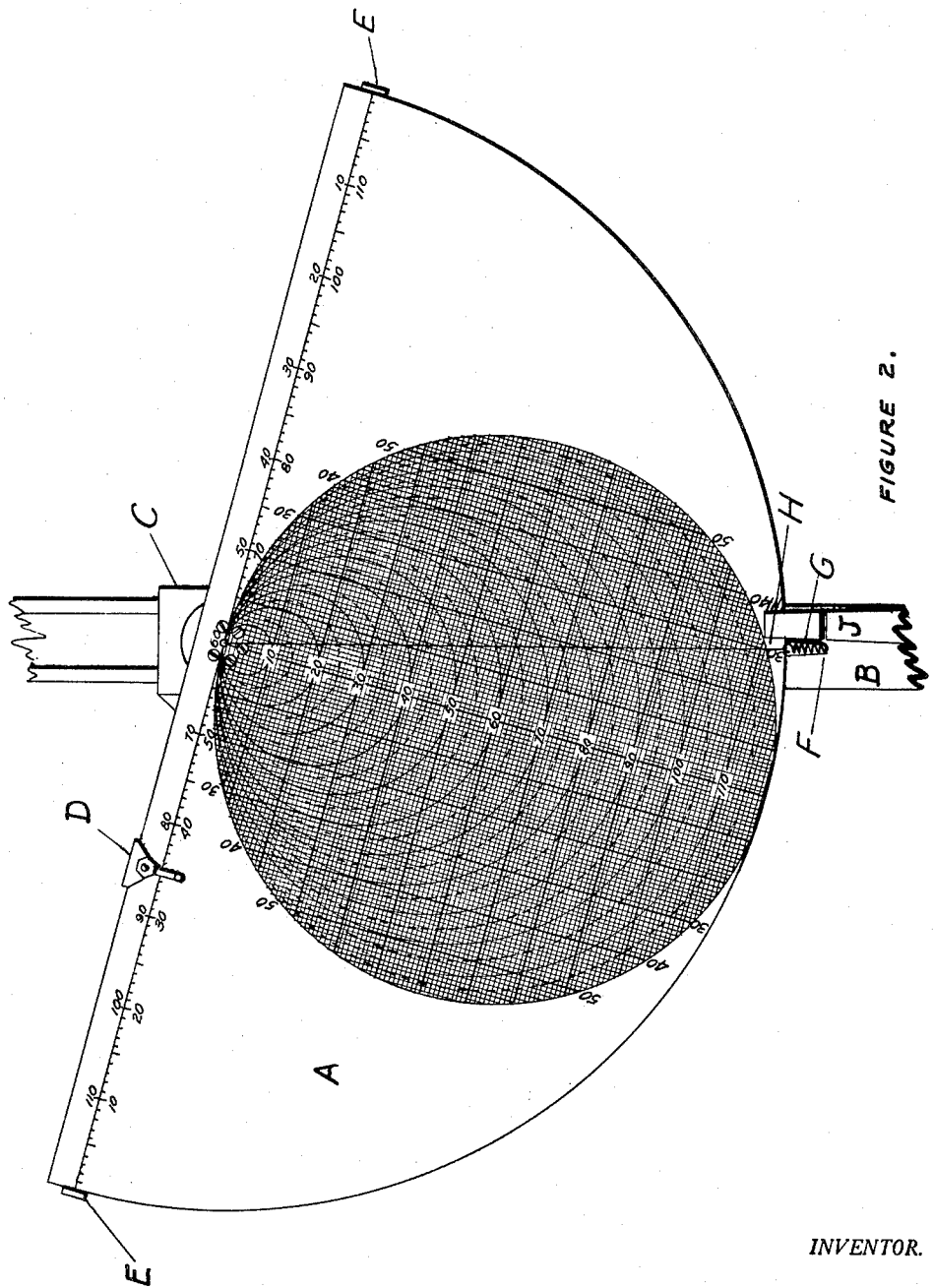

March 19, 1957　　　E. L. FOSTER　　　2,785,466
STADIA TOPOGRAPH
Filed Dec. 21, 1954　　　　　　　　　3 Sheets-Sheet 3
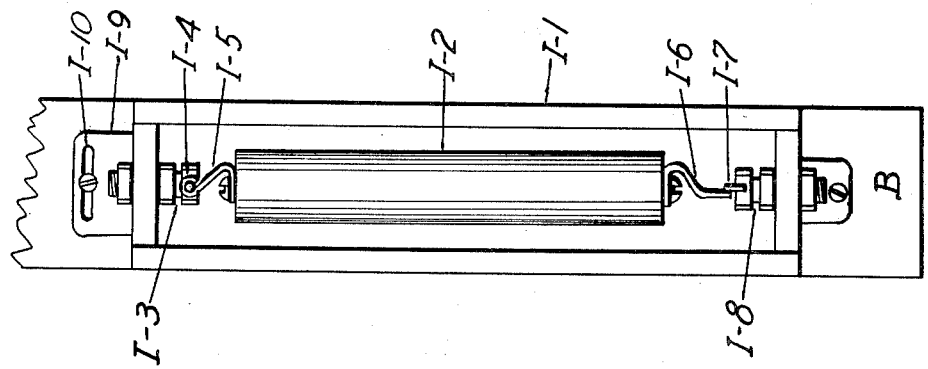
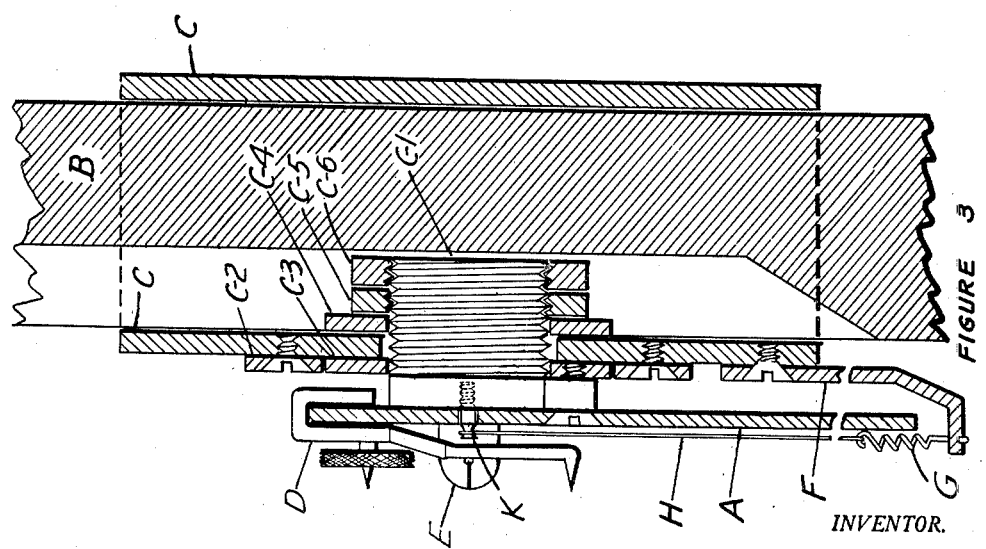
INVENTOR.
BY
Eugene L. Foster

2,785,466
STADIA TOPOGRAPH

Eugene L. Foster, Los Banos, Calif.

Application December 21, 1954, Serial No. 476,824

3 Claims. (Cl. 33—71)

Brief summary

The stadia topograph is by nature a surveying instrument, in that its intended use is that of gathering survey data in the field. In substance it is, together with other common and necessary accessories, an operable mechanical arrangement and combination of the known principle of the stadia, embodied in the linear and circular stadia scales as hereinafter described, the known principle of the graphical determination of vertical and horizontal coordinates in a vertical plane, the stationary zero vertical wire and auditory leveling device, all as described in the following specifications. In doing its work, the stadia topograph completely ignores the slope distance and depends entirely upon the stadia principle to locate the ground point in the field of plane co-ordinates. In that, it definitely is a novel and useful aid in the gathering of topographic data.

Drawings

Of the four figures on three sheets, Figure 1 represents the complete instrument, Figure 2 is an enlarged view of the graph plate A, Figure 3 is a sectional drawing which cuts through the rotating axis of the instrument and Figure 4 is an enlarged view of the auditory leveling device I which operates in conjunction with flashlight batteries and a buzzer, attached.

The complete instrument

The complete instrument can be considered as being composed of the staff B which supports the instrument, the graph plate A upon which readings are obtained and upon which resulting data are indicated, the bracket C which connects the graph plate to the staff and to which the stationary wire arm is attached, and the auditory leveling device I which indicates by means of a buzzer, the position at which a setting must be made.

The staff B

The staff is of smooth, varnished oak. It is six feet long, one and three quarters inches wide and seven eighths of an inch thick. From the top downward to a point about a foot and a half below the top, there is provided a groove one and one eighth inches wide and three eighths of an inch deep to allow the bracket C to be slipped on the staff from the top. The axle C–1 in Figure 3 which is the rotating axis of the graph plate A protrudes into this groove.

Graph plate A

The graph plate, the primary movable part of the instrument, is cut from approximately one sixteenth inch thick metal to the form of a half-disc, twenty-four inches in diameter, except that five eighths of an inch of metal is left to extend beyond the diameter of the disc. After smoothing and finishing, it is then painted with quick, hard drying black enamel. A space one quarter of an inch wide along the straight edge of the graph plate is left unpainted to allow movement of the sliding linear stadia indicator D. After the enamel has dried sufficiently, it is buffed with very fine sandpaper to obtain a dull finish. Then fine lines are scribed through it and into the metal as follows. A straight line is scribed upon the diameter of the disc. Along this line is marked and calibrated the linear stadia scale. The foot marks are scribed and the ten foot marks are numerated in both directions. Along this scale one inch is equal to five feet and the scale is uniform.

Next a radius line is scribed perpendicular to the line of the linear stadia scale all the way to the circumference. This line represents a plumb line as the diameter represents a horizontal line when the instrument is in a normal, level position. This line being twelve inches long, points one quarter of an inch apart are marked along it for a distance of six inches beginning at the exact center of the disc. Using each one of these points as a center, full circles are scribed, each one passing through the exact center of the disc, except that the circles are scribed as dashed and solid lines alternately so that the solid lines cross the radius or plumb line at one inch intervals and the dashed lines cross the plumb line at one half inch intervals, counting from the center. These circles constitute the circular stadia scale which translates linear stadia scale readings. This process will be described later under the heading of "How to Operate the Instrument." The solid circles are, in terms of the linear stadia scale, ten foot intervals and in like manner the dashed lines represent the intervening five foot intervals. The ten foot intervals are numerated along the radius or plumb line, beginning also with the center of the disc.

Now, fine lines are scribed parallel to both the diameter line and the radius line, one tenth of an inch apart and covering the entire area inside the largest of the solid circles, much as standard cross-section paper is printed. Every tenth line both ways is a heavy line. In a vertical plane through the instrument, these one tenth inch lines represent one foot vertical and horizontal co-ordinates. We numerated the horizontal co-ordinates when we numerated the circular stadia scale. The vertical co-ordinates are now numerated in the same manner. All lines are now scribed and numerated on the face of the graph plate.

Peep sights

Two peep sights E, Figures 2 and 3, are provided, one at each end of the line representing the diameter. They are made of the same metal as the disc.

They are one half inch wide and bent in an L so that they may be attached to the back side of the graph plate with two round headed machine screws each. A one sixteenth inch hole is drilled in each one exactly on the diameter line and one quarter of an inch from the face of the graph plate.

Linear stadia indicator D

The linear stadia indicator D shown in Figures 1, 2 and 3 is also made of the same metal as the graph plate. It is bent completely over the straight edge of the plate and finished in such a manner that it slides freely and smoothly along this edge and yet fits to it snugly. A set screw is provided on the front side for the purpose of clamping the indicator at any setting. The leg of the indicator on the "face" side of the plate extends downward about one inch where it bends outward away from the face of the graph plate A and tapers to a point about one quarter of an inch from the face of the graph plate. This places it in line with the two holes in the peep sights E and E and exactly four tenths of an inch below them. Also, this "point" is eight tenths of an inch below a similar point protruding from the center of the set screw mentioned above. The interval between these two "points" viewed through either peep sight at a setting which will produce a four foot interval on the stadia rod held vertically will cause the indicator D to be moved to a position indicating a linear stadia reading. In other words, it being intended that the center of the graph be five feet above the ground, these indicator points must always be brought to coincide with the three foot and seven foot marks on the stadia rod.

It will be noted in Figure 2 that the graph plate A is attached to the axle (C–1 in Figure 3) by means of five small flat headed machine screws. In Figure 3 it will be noted that these five screws extend through a flanged head on member C–1 and hold the graph plate A, an axle C–1 and an inner-outside bearing C–3 firmly together. Figure 2 also shows the clamp J which holds the graph plate in any position. It is a common hardwood clothespin and is attached to the staff B by two ordinary wood screws.

There are four other parts which can be seen in Figure 2. They are the vertical wire H, vertical wire spring G, the wire arm F and a tiny pin K to which the upper end of the wire is attached and which is screwed into the exact center of the axle C–1. It can be seen plainly in Figure 3 and protrudes no more than one sixteenth of an inch from the face of the graph plate A. The vertical wire is a fine white wire. The spring G is approximately one eighth inch by one half inch long and serves the purpose of keeping the wire taut. To provide a reference line fixed relative to the staff, the wire arm is attached to the bracket C (see Figure 3) by machine screw means and extends downward behind the graph plate, then outward slightly to where the spring is attached.

The bracket C

Turning our attention to Figure 3 we see the relationships between the graph plate A, the bracket C and the staff B. In connection with this drawing it must be explained that the parts cut by the plane of section are the graph plate A, the wire arm F, the bracket C, the outer-outside bearing C–2, the inner-outside bearing C–3, the inside bearing C–4, the adjusting nut C–5, the set nut C–6 and the staff B.

Bearings C–2, C–3 and C–4 are constituted by one sixteenth inch machined brass washers. The axle C–1 is a five eighths inch S. A. E. cap screw one half inch long. Its head has been cut to a one eighth inch thickness and one side of it has been cut off to allow passage of the linear stadia indicator. Graph plate A, axle C–1 and inner-outside bearing C–3 being held firmly together, C–3 turns inside C–2 and against bracket C. Inside bearing C–4 is held against bracket C by adjusting nut C–5 and set nut C–6 which are both one eighth of an inch thick. The entire bracket is slipped down over the staff and held in place by a large hand operated set screw at one of its edges.

Auditory leveling device

The auditory leveling device I, Figure 4, is composed of the pendulum I–2, two flashlight batteries and a buzzer. The pendulum is completely enclosed in an oak box I–1 one and three quarters inches by one and three quarters inches and seven inches long. As seen in Figure 1, it is placed as near as possible to the bottom end of the staff in order to reduce its movement in relation to the upper part of the instrument. Also, in Figure 1, the cover of the box was left off so as to show what the object is.

The pendulum housing I–1 is attached to a flat bracket I–9 which is attached to the staff B with one screw at the bottom and one screw and an adjusting slot I–10 at the top, in such a manner that adjustments are made in the same plane as the graph, above. In the center at the top and bottom of the box are quarter inch by three quarter inch cap screws with two nuts each. Through the upper bolt head a small hole is drilled and a pin I–4 inserted which holds the pendulum hinge I–5. The hinge is of copper. The pendulum is of three quarter inch cold rolled steel, four and one half inches long. The hinge is mounted on the upper mount in such a way that the pendulum can only swing in the same plane as the plane in which the graph, above, rotates.

A piece of Number 12 annealed copper wire I–6 is attached to the bottom end of the pendulum. This wire, as the pendulum swings, bumps against a copper blade I–7 which is set into the lower bolt. When the instrument is in good adjustment, at I–10, and the instrument is in normal, level position, the contact wire I–6 just barely touches the contact blade I–7 and there is an intermittent signal from the buzzer. Movement from this point forward in the plane will cause no sound and movement backward will cause a continuous signal. Connection to the buzzer is indicated at I–3 and connection to the batteries is indicated at I–8. Batteries and buzzer are located on the opposite side of the staff.

How to operate the stadia topograph

The stadia topograph is basically a topographic instrument in that its intended use is that of gathering topographic data in the field. It is not a directional instrument, therefore it must be operated from an established line and from known elevations. However it may be used almost anywhere to ascertain relative differences in elevation and distances. It will doubtless be most widely used in route surveying. For example, it is especially adapted to the purpose of measuring cross-sections, setting slope stakes and re-setting grades from slope stakes.

First the instrument must be checked to be sure it is in proper adjustment. Clamp the graph plate in a position where the vertical wire coincides with the zero line which is perpendicular to the linear stadit scale at the center. In this position there should be an intermittent signal on the buzzer when the line of sight is made level. This can be accomplished by moving the pendulum box by means of the screw and slot at the top of the pendulum box bracket. The check can be made by the two peg method much as it is done with any leveling instrument.

Let us assume that we are using the stadia topograph to take cross-sections. The instrument is very light and can be carried in one hand. It is set up instantly by merely standing it on a point along the centerline, the station and elevation of which are known. The rodman moves out at right angles to the centerline. Incidentally, the rod which is used with this instrument need have only three distinct marks upon its face, one each at the three, five and seven foot mark above the ground. It is equipped with a rod level, for the rod must be held quite vertical when readings are taken.

Assume the rodman has set up the rod vertically at a point on the cross-section. Grasp the staff B near the bottom of the graph plate A compressing the clamp J which releases the graph plate. With the other hand, rotate the graph plate so that, the staff being approximately vertical, the peep sights E are in line with the five foot mark on the rod. Then release the clamp which will secure the graph plate in that position. Move the linear stadia indicator D until its pointers coincide with the three foot and seven foot marks on the rod and secure it in that position with the set screw provided.

Now, were the line of sight level at this stage of the operation, the linear stadia scale would indicate the true horizontal distance (in feet) from the instrument to the rod. In any other position the linear scale indicates only a stadia reading. It is not necessary to read the linear stadia scale at this time. As soon as the indicator has been secured, again grasp the staff as before and compress the clamp, releasing the graph plate. With the other hand, hold the graph plate. Now, incline the staff forward or backward as the case may be, while, by means of the peep sights, directing the line of sight exactly on the five foot mark on the rod. When the staff has thus been brought into a position causing the buzzer to emit an intermittent signal, release the clamp, securing the graph plate in that position.

Now the instrument is ready to read except that, if so desired, a check sighting on the five foot mark may be made quickly with the graph plate secured in this position. Read the linear stadia scale. In Figure 2, if the rod were held above and to the left of the instrument, the linear scale indicator would appear at the 85 foot mark. Transfer this reading to the circular stadia scale. That is accomplished by moving down along the vertical wire H to the point where it intersects the circular dashed line representing 85 feet. This point of intersection, in the field of co-ordinates, represents the point on the ground under the rod, zero in the field of co-ordinates being the point under the instrument.

Counting to the right from the zero line to the point of intersection, we read a distance of 21.3 feet, which means that the point under the rod is 21.3 feet higher than the point under the instrument. Counting downward from the zero point to the point of intersection, we read 78.9 feet, which means that the horizontal distance between the instrument and the rod is 78.9 feet. These two figures will, of course, be entered in the field note book as any other cross-section notes as follows:

$$\frac{\text{plus } 21.3}{78.9}$$

It will be noted that during the taking of this "shot" a tape was not used. It is true that it is absolutely unnecessary to use a tape with this instrument unless extreme accuracy is desired. In such a case, it is doubtful if the accuracy of the instrument reading would be commensurate with an accurately taped measurement. Although it is true that the slope distance is ignored in the operation of this instrument, the scaled distance along the vertical wire H from zero to the point of intersection is actually the slope distance.

I claim:

1. A topographic survey instrument comprising a graph plate on which is inscribed a graph comprising circles of uniformly varying diameter and tangent to each other at one common point of tangency, transverse lines parallel to the common tangent of said circles, longitudinal lines perpendicular to the transverse lines, all straight lines being uniformly spaced a distance equal to the distance between any two successive circles directly opposite said point of tangency, and numerical indicia designating distances in the field of observation represented by the distances of said lines from said point of tangency; and in combination with said graph plate, sighting means mounted thereon defining a line of sight parallel to said common tangent, a support, means connecting said plate to said support for pivoting about an axis perpendicular to said plate at said point of tangency, means providing a straight reference line for said graph perpendicular to said pivot axis and fixed relative to said support, and means on said support for indicating the verticality of said reference line.

2. A topographic surveying instrument as set forth in the preceding claim, having a stadia scale inscribed along said common tangent and further comprising a stadia indicator slidably mounted on the graph plate and guided thereby along said scale and having two sighting points spaced apart on a line transverse to said line of sight.

3. A topographic survey instrument as set forth in the preceding claim, and in which said support comprises a staff and a bracket adapted to be clamped thereon, and in which said means for indicating verticality comprises an electric battery, a pendulum suspended from the support, electrical contacts closed by the pendulum when said reference line is vertical, and electrical signal means connected for energization by said battery upon the closing of said contacts.

References Cited in the file of this patent

UNITED STATES PATENTS

| | | |
|---|---|---|
| 940,504 | Brayton | Nov. 16, 1909 |
| 967,510 | Glosser | Aug. 16, 1910 |
| 1,058,320 | Mitchell et al. | Apr. 8, 1913 |
| 1,901,880 | Shuster | Mar. 21, 1933 |
| 2,189,964 | Sealey | Feb. 13, 1940 |

FOREIGN PATENTS

| | | |
|---|---|---|
| 2,468 | Great Britain | Feb. 1, 1910 |
| 148,635 | Great Britain | July 29, 1920 |